(12) United States Patent
Steinmaier et al.

(10) Patent No.: US 11,598,385 B2
(45) Date of Patent: Mar. 7, 2023

(54) ELASTIC BEARING

(71) Applicant: Süddeutsche Gelenkscheibenfabrik GmbH & Co. KG, Waldkraiburg (DE)

(72) Inventors: Klaus Steinmaier, Kraiburg (DE); Josef Stubenrauch, Rott am Inn (DE)

(73) Assignee: SÜDDEUTSCHE GELENKSCHEIBENFABRIK GMBH & CO. KG, Waldkraiburg (DE)

( * ) Notice: Subject to any disclaimer, the term of this patent is extended or adjusted under 35 U.S.C. 154(b) by 365 days.

(21) Appl. No.: 16/779,097

(22) Filed: Jan. 31, 2020

(65) Prior Publication Data

US 2020/0248768 A1 Aug. 6, 2020

(30) Foreign Application Priority Data

Jan. 31, 2019 (DE) .......................... 102019000696.8

(51) Int. Cl.
*F16F 1/377* (2006.01)
*F01N 13/18* (2010.01)

(52) U.S. Cl.
CPC .......... *F16F 1/377* (2013.01); *F01N 13/1822* (2013.01)

(58) Field of Classification Search
CPC .......... F16F 1/371; F16F 1/3713; F16F 1/373; F16F 1/3732; F16F 1/376; F16F 1/377
See application file for complete search history.

(56) References Cited

U.S. PATENT DOCUMENTS

| | | | | |
|---|---|---|---|---|
| 4,893,778 A | * | 1/1990 | Drabing | F16L 55/035 248/610 |
| 5,271,595 A | * | 12/1993 | Simon | F16L 55/035 267/141.1 |
| 6,264,164 B1 | * | 7/2001 | Steinmaier | B60K 13/04 248/610 |
| 6,343,777 B1 | * | 2/2002 | Andra | B60K 13/04 267/152 |

(Continued)

FOREIGN PATENT DOCUMENTS

| DE | 10013121 C1 | 1/2001 |
|---|---|---|
| DE | 10311196 A1 | 10/2004 |
| DE | 102004042611 B3 | 2/2006 |

OTHER PUBLICATIONS

German Search Report for corresponding German Patent Application No. 10 2019 000 696.8 dated Sep. 17, 2019, 12 pages.

*Primary Examiner* — Vishal R Sahni
(74) *Attorney, Agent, or Firm* — Moore & Van Allen, PLLC; Henry B. Ward, III

(57) ABSTRACT

An elastic bearing, in particular for the suspension of a load, is provide that comprises at least one elastic body that has at least two bending beams and at least two receiving openings for receiving coupling elements, wherein at least one of the at least two bending beams is connected to at least one articulated section, and at least one reinforcement that is embedded in the at least one elastic body. The reinforcement extends at least into the at least two bending beams, wherein the reinforcement extends at least essentially linearly into the at least two bending beams in at least one predetermined section of the particular bending beam. The at least two bending beams each have at least one supporting point that ensures the at least essentially linear course of the reinforcement in the predetermined section.

19 Claims, 3 Drawing Sheets

(56) References Cited

U.S. PATENT DOCUMENTS

| | | | | |
|---|---|---|---|---|
| 6,622,975 | B2* | 9/2003 | Steinmaier | B60K 13/04 248/634 |
| 7,052,399 | B2* | 5/2006 | Duggan | F16D 3/60 464/69 |
| 7,575,216 | B2* | 8/2009 | Zimmermann | F16F 1/46 248/610 |
| 2008/0191117 | A1* | 8/2008 | Steinmaier | F01N 13/1822 248/610 |
| 2012/0126091 | A1* | 5/2012 | Kleindorfer | B60K 13/04 248/674 |
| 2018/0216688 | A1* | 8/2018 | Steinmaier | F01N 13/1822 |

* cited by examiner

ELASTIC BEARING

FIELD OF THE INVENTION

The present invention relates to an elastic bearing for a load. The elastic bearing may be used, for example, for installing an exhaust gas system on a body of a vehicle. However, the elastic bearing may also be used in other fields for bearing or mounting loads on devices or units. Via coupling elements such as bolts or similar elements, the elastic bearing may be coupled to the devices or units to be connected via the bearing.

BACKGROUND OF THE INVENTION

The suspension device disclosed in DE 100 13 121 C1, for example, is known from the prior art. The suspension device has two bushings into which bolts may be inserted. In addition, the suspension device includes two articulated zones, between which a load beam extends. The load beam is connected to two support legs which are connected to one another. The support legs and the load beam are manufactured in one piece from a rubber. An insert is embedded in the support legs and the load beam.

BRIEF SUMMARY OF THE INVENTION

The object of the present invention is to provide an elastic bearing that has a predetermined rigidity and improved performance.

This object is achieved with an elastic bearing comprising at least one elastic body that has at least two bending beams and at least two receiving openings for receiving coupling elements, wherein at least one of the at least two bending beams is connected to at least one articulated section. The elastic bearing further comprises at least one reinforcement that is embedded in the at least one elastic body, wherein the reinforcement extends at least into the at least two bending beams, wherein the reinforcement extends at least essentially linearly into the at least two bending beams in at least one predetermined section of the particular bending beam, wherein the at least two bending beams each have at least one supporting point that ensures the at least essentially linear course of the reinforcement in the predetermined section.

According to another embodiment, in the predetermined section of at least one of the at least two bending beams, the reinforcement extends at least essentially congruently with a straight line that is tangent to one of the articulated sections. In another embodiment, the reinforcement is at least partially exposed at the supporting points. In another embodiment, the elastic body has an indentation or a similar feature on at least one of the supporting points. In another embodiment, the at least one supporting point is provided in the area of at least one selected from the group consisting of an outer surface and at least one lateral surface. In another embodiment, the indentation or the similar feature on the at least one supporting point is formed on at least one selected from the group consisting of an outer surface and on at least one lateral surface of the elastic body. In another embodiment, the predetermined section extends starting from one of the articulated sections. In another embodiment, the distance of the reinforcement to a wall of a central opening in the elastic body, starting from one of the receiving openings, decreases in the direction of one of the articulated sections. In another embodiment, the distance of the reinforcement to the at least one outer surface of the elastic body, starting from the receiving openings, increases in the direction of one of the articulated sections. In another embodiment, the reinforcement does not change direction at the supporting points. In another embodiment, the at least one reinforcement has at least two reinforcement sections. In another embodiment, each of the at least two reinforcement sections has at least one deflection point. In another embodiment, the at least one deflection point is offset with respect to the at least one supporting point. In another embodiment, the elastic bearing has a symmetrical design with respect to a straight line that extends through the at least two articulated sections. In yet another embodiment, the elastic bearing has a symmetrical design with respect to a straight line that extends through the receiving openings. In still another embodiment, the at least one reinforcement is a thread reinforcement, a textile reinforcement, or a wire reinforcement.

A defined course of the reinforcement is achieved with the supporting points. Via the defined course of the reinforcement in the elastic body, it may be ensured that the elastic bearing has a setpoint rigidity. Thus, the supporting points may be used to prevent fluctuations in the rigidity of the elastic bearing, which may have an adverse effect on performance as well as the service life of the elastic bearing.

In this context, "at least essentially linearly" means that the reinforcement in the predetermined section actually has a linear course, or has a slight convex curvature in relation to a straight line that extends through the receiving openings. The straight line may extend through the midpoints of the at least two receiving openings.

In the at least one predetermined section of one of the at least two bending beams, the reinforcement may extend congruently with a straight line that is tangent to one of the articulated sections. In the predetermined section, the reinforcement may also extend at least essentially parallel to or congruently with a tangent to one of the receiving openings and to the curvature of the articulated section.

The at least one supporting point may be provided in the area of at least one outer surface and/or at least one lateral surface of the elastic body. The supporting points may thus support the reinforcement from different directions, thus holding the reinforcement in its predetermined position.

The reinforcement sections may be completely or partially exposed at the at least one supporting point. In particular, the outer side of one of the reinforcement sections may be completely or partially exposed at the at least one supporting point. At the supporting points, the reinforcement sections may thus be discernible in the elastic body from the outside. At the at least one supporting point the reinforcement section may be completely or partially free from the elastic material of the elastic body. However, it is likewise conceivable for a thin layer of elastic material of the elastic body to completely or partially remain at the supporting points. The material of the elastic body may be an elastomer, rubber, or also a silicone. The at least one deflection point may be discernible on an outer surface of the elastic body. The outer surfaces of the elastic body may have an indentation, for example, at the at least one deflection point.

The elastic body may have an indentation or a similar feature such as a groove, a channel, or the like at the at least one supporting point. The indentations at the supporting points may extend over the entire extension of the outer surface of the elastic body or over portions of the outer surface of the elastic body. The indentation or the similar feature on the at least one supporting point may be formed on at least one outer surface and/or on at least one lateral surface of the elastic body.

The predetermined section may extend starting from one of the articulated sections. The predetermined section may extend over the entire bending beam. The predetermined section may also extend over only one or more subsections of the particular bending beam. The predetermined section may also extend starting from one of the receiving openings.

The distance of the reinforcement from the wall of an opening in the elastic body, starting from one of the receiving openings, may decrease in the direction of one of the articulated sections. The distance of the reinforcement from an outer surface of the elastic body, starting from the receiving openings, may increase in the direction of one of the articulated sections. It is possible for the reinforcement to not change direction at the supporting points. The direction of the reinforcement or its angle with respect to the straight lines extending through the receiving openings remains the same at the at least one supporting point.

The reinforcement may be supportable via the supporting points in such a way that the reinforcement assumes an at least essentially linear course, at least in the predetermined section. The reinforcement may be supported via the supporting points or at the supporting points during manufacture of the elastic bearing. The reinforcement may thus be prevented from being pressed outwardly in the area of the bending beams when the elastic material for the elastic body is introduced. The supporting points prevent the reinforcement from assuming an undefined arch-shaped course in the area of the bending beams. By use of the supporting points, it may be ensured that the reinforcement has an at least essentially linear course, at least in the predetermined section.

The at least one reinforcement may have at least two reinforcement sections. Each of the reinforcement sections may extend in one of the at least two bending beams. The bending beams may also each be connected to an articulated section. Each of the at least two reinforcement sections may have at least one deflection point at which it changes direction. Each of the at least two reinforcement sections may be curved at the at least one deflection point, opposite from its curvature in the articulated section in which it extends.

At the at least one deflection point, each of the at least two reinforcement sections may be concavely curved in relation to a straight line that extends through the receiving openings. The straight line may extend, for example, through the midpoints of the at least two receiving openings. At the at least one articulated section, each of the at least two reinforcement sections may be convexly curved in relation to the straight line that extends through the receiving openings.

The at least two reinforcement sections may be connected to one another at at least one connecting point. A deflection point may be formed in each of the at least two reinforcement sections by means of the at least one connecting point. The at least two reinforcement sections may be sewn or woven together at the at least one connecting point. The at least two reinforcement sections with their inner sides may rest against one another at the at least one connecting point. The inner sides of the at least two reinforcement sections may rest against one another over the entire extension of the reinforcement sections in the Y direction. The two reinforcement sections may also be connected via a spaced sewing process or a spaced weaving process in which the inner sides of the reinforcement sections do not rest against one another.

The elastic bearing may have a symmetrical design with respect to a straight line that extends through the at least two articulated sections. The elastic bearing may also have a symmetrical design with respect to the straight line that extends through the receiving openings. The intersection point of these two straight lines may define the component center of the elastic bearing. The elastic bearing may have a symmetrical design with respect to the straight line that extends through the at least two articulated sections and also with respect to the straight line that extends through the receiving openings.

The at least one deflection point may be offset with respect to the at least one supporting point. The predetermined section in which the reinforcement at least essentially linearly extends may extend to a deflection point or to the vicinity of a deflection point. The reinforcement changes direction noticeably at the deflection point, and then has a concave curvature in relation to the straight line.

In addition, a further bending beam may be connected to each articulated section, so that the elastic bearing may include four bending beams. At least one of the two receiving openings may be situated between two mutually connected bending beams. In this case, the bending beams may extend from one of the receiving openings to one of the articulated sections.

The at least two bending beams and the at least two articulated sections may form a spring section. At least one of the at least two receiving openings may be situated outside the spring section. Both receiving openings may also be provided outside the spring section. The receiving opening situated outside the spring section or the receiving openings situated outside the spring section may be outside the force flux of the bending beams. In addition, the distance between the two receiving openings may be increased by situating the receiving openings outside the spring section. The extension of the elastic bearing in the X direction may be reduced in this way. The elastic bearing may thus occupy less installation space in the X direction.

The at least one connecting point at which the at least two reinforcement sections are connected to one another may be provided in the surroundings of the at least one receiving opening. The at least one connecting point may be provided above or below at least one of the receiving openings, along the straight lines that extend through the receiving openings. The at least one connecting point may also be provided between the spring section and at least one of the receiving openings. The at least two reinforcement sections may also be connected to one another at two, three, or more connecting points.

A cross-sectional area of at least one end of at least one of the at least two reinforcement sections may exit completely or partially at an outer surface of the at least one elastic body. A section of an outer surface of the elastic body may be formed by the cross-sectional area or by portions of the cross-sectional area of one of the reinforcement sections. The cross-sectional areas of one end of the at least two reinforcement sections may also exit completely or partially in each case at an outer surface of the elastic body, or may be completely or partially discernible at this outer surface. The two ends of each of the two reinforcement sections may exit completely or partially in each case at another outer surface of the elastic body. The outer surfaces may extend transversely with respect to the straight lines that extend through the receiving openings.

The at least two reinforcement sections may extend independently of one another in the elastic body. The at least two reinforcement sections may form separate elements that extend separately from one another in the elastic body. The at least two reinforcement sections may have a predetermined distance from one another over their entire extension.

In this case the elastic material of the elastic body may establish a connection between the two reinforcement sections.

The at least two reinforcement sections may have a one-piece design. The at least two reinforcement sections may together form a band and may each have one free end. The free ends of the two reinforcement sections may be joined together. In this case, the inner side of one of the two reinforcement sections may rest on the outer side of the other reinforcement section, so that the free ends are joined together. The free ends of the reinforcement sections may also exit from the elastic body independently of one another at an outer surface. The two free ends of the reinforcement sections may also be joined together via a connecting point. In this case, the two inner sides of the reinforcement sections rest against one another. The at least two reinforcement sections may also be part of an annular or circumferential reinforcement. The two reinforcement sections may likewise be connected to one another via a spaced sewing process or a spaced weaving process in which the two reinforcement sections are not in direct contact with one another, but instead are connected to one another at the connecting point over the distance that exists between them. These processes may also be used for producing the connecting points.

The elastic bearing may have a higher rigidity in the direction of the Y axis than in the direction of the Z axis. The at least two reinforcement sections may extend in parallel to one another, at least in sections.

The at least one reinforcement may be a thread reinforcement, a textile reinforcement, or a wire reinforcement. The reinforcement may be webbing, a band, or also a film. The reinforcement may be a textile band or a textile ring. The reinforcement may be a woven band. The woven band may have gaps that allow the elastomer to flow through during injection of the elastomer. The reinforcement may also be a multi-ply woven fabric made up of individual threads running in parallel. The individual threads may be joined together via one or more transversely running threads. The reinforcement may also have cross plies.

BRIEF DESCRIPTION OF DRAWINGS

Exemplary embodiments of the present invention are described below with reference to the appended figures, which show the following.

DETAILED DESCRIPTION OF INVENTION

Figure 1:
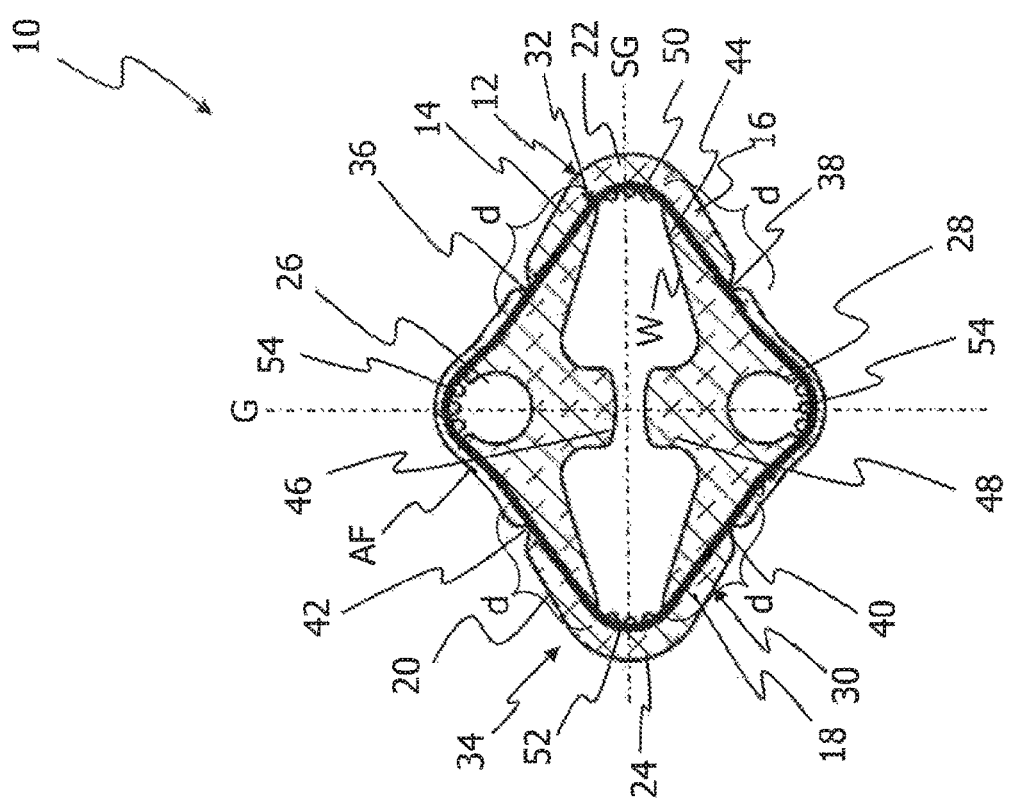
FIG. 1 shows a sectional view of an elastic bearing according to a first embodiment.

FIG. 1 shows a sectional view of an elastic bearing 10 according to a first embodiment. The elastic bearing 10 has an elastic body 12. The elastic body 12 has four bending beams 14, 16, 18, 20. The bending beams 14 and 16 are connected to one another via an articulated section 22. The bending beams 18 and 20 are connected via an articulated section 24. The elastic body 12 also has two receiving openings 26 and 28. The receiving openings 26 and 28 are designed for receiving coupling elements such as bolts (not shown), which are provided on the devices to be connected via the elastic bearing 10.

A reinforcement 30 extends in the elastic body 12. The reinforcement 30 has two reinforcement sections 32 and 34. The reinforcement sections 32 and 34 extend along the bending beams 14, 16, 18, 20 and the articulated sections 22 and 24. The reinforcement sections 32 and 34 extend from the receiving opening 26 to the receiving opening 28. According to this embodiment, the reinforcement sections 32 and 34 are connected to one another. The reinforcement 30 may be a thread reinforcement, a textile reinforcement, or also a wire reinforcement. The reinforcement may have a ring-shaped or a strip-shaped design. A textile reinforcement may be formed from at least one textile band. The ends of such a textile band may be joined together. For example, the ends may be sewn or woven together. A thread reinforcement may be formed from one thread or multiple threads. The thread or the threads may form a multi-ply woven fabric or a winding. It is likewise possible for the threads to be joined together.

The bending beams 14, 16, 18, 20 have supporting points 36, 38, 40, 42, respectively. The supporting points 36, 38, 40, and 42 ensure an at least essentially linear course of the reinforcement sections 32, 34 in the bending beams 14, 16, 18, 20 along a predetermined section d. The reinforcement sections 32 and 34 may extend over this predetermined section d at an essentially constant angle with respect to the straight line G. The essentially linear course of the reinforcement sections 32, 34 in section d is fixed by the elastic material of the elastic body 12. The supporting points 36, 38, 40, 42 are provided essentially centrally on the bending beams 14, 16, 18, 20.

Indentations on the outer surface AF of the elastic body 12 are discernible at the supporting points 36, 38, 40, 42. Due to the indentations, the reinforcement sections 32 and 34 or their outer sides may be discernible from the outside in the area of the supporting points 36, 38, 40, 42. However, a thin layer of the elastic material may also completely or partially remain over the reinforcement at the indentations 50, 52, 54. The outer surface AF connects the two lateral surfaces (not shown) of the elastic body 12 extending essentially parallel to one another.

The term "at least essentially linear" is understood to mean that the reinforcement sections 32, 34 in the predetermined section d actually extend linearly or have a slight convex curvature relative to the straight line G. The reinforcement sections 32 and 34 may extend in this predetermined section d at an essentially constant angle with respect to the straight line G.

By use of the supporting points 36, 38, 40, 42 a defined course of the reinforcement 30 or of the reinforcement sections 32 and 34 is achieved, via which it may be ensured that the elastic bearing 10 has setpoint rigidity. Fluctuations in the rigidity of the elastic bearing may thus be prevented via the supporting points 36, 38, 40, 42.

The elastic bearing 10 has a symmetrical design with respect to the straight line G that extends through the receiving openings 26 and 28. In addition, the elastic bearing 10 has a symmetrical design with respect to a straight line SG that extends through the articulated sections 22 and 24. The intersection point of the straight line G and the straight line SG defines the center of the elastic bearing 10.

The elastic body 12 has an opening 44 with a wall W. The opening 44 extends between the receiving openings 26, 28 and the articulated sections 22 and 24. Buffer elements 46 and 48 are provided in the opening 44 and extend toward one another in the opening 44. The buffer elements 46 and 48 in sections extend along the straight line G. The distance of the reinforcement 30 or of the reinforcement sections 32, 34 from the wall W of an opening 44 in the elastic body 12, starting from one of the receiving openings 26, 28, may decrease in the direction of one of the articulated sections 22, 24. The distance of the reinforcement 30 or of the reinforcement sections 32, 34 from an outer surface AF of the elastic body 12, starting from the receiving openings 26, 28, may increase in the direction of one of the articulated sections 22, 24.

At the articulated sections 22, 24, indentations 50 and 52 in the elastomer body 12 are discernible on the inner side of the reinforcement sections 32, 34. Indentations 54 are also provided in the elastomer body 12 in the area of the receiving openings 26 and 28, on the inner side of the reinforcement 30. The reinforcement 30 may be completely or partially exposed in the area of the indentations 50, 52, and 54. However, at the indentations 50, 52, 54 a thin layer of the elastic material may also completely or partially remain over the reinforcement.

Figure 2:
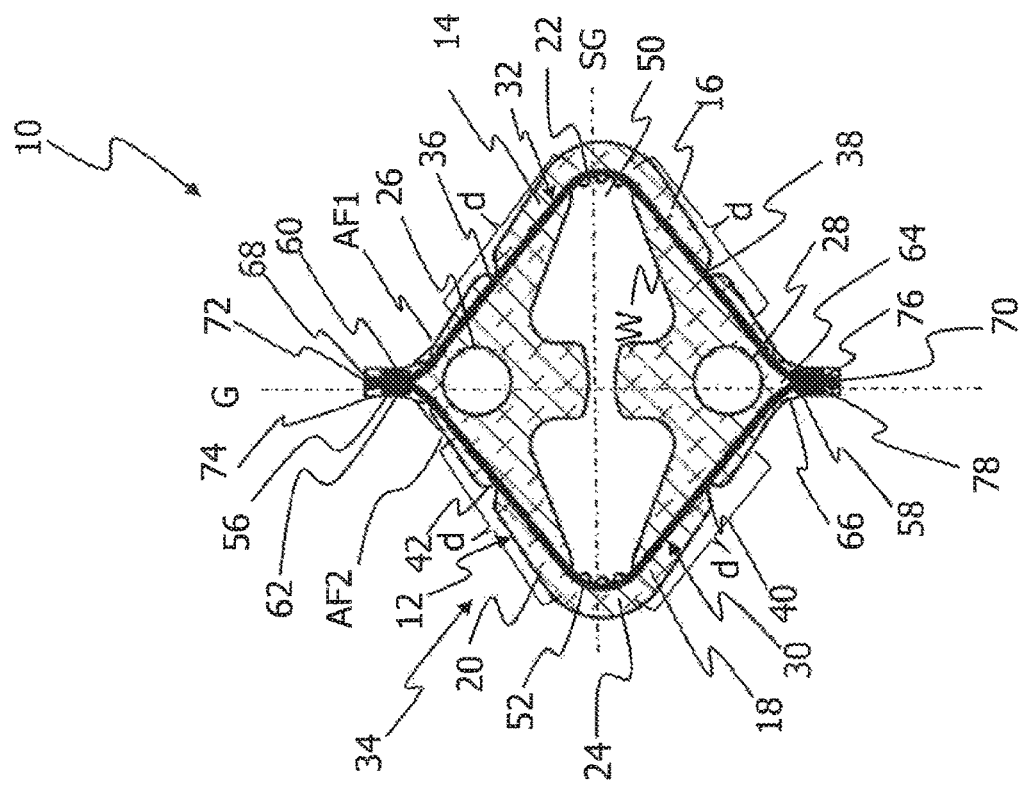
FIG. 2 shows a sectional view of an elastic bearing according to a second embodiment.

FIG. 2 shows a sectional view of a bearing 10 according to a further embodiment. The bearing 10 has the elastic body 12 and the reinforcement 30. The reinforcement 30 includes the reinforcement sections 32 and 34. The reinforcement sections 32 and 34 extend along the bending beams 14, 16, 18, 20 and along the articulated sections 22 and 24. The reinforcement sections 32 and 34 are connected to one another at two connecting points 56 and 58. The reinforcement sections 32 and 34 may be sewn or woven together, for example, at the connecting points 56 and 58. The reinforcement sections 32 and 34 may be formed by two textile bands, for example.

Also in this embodiment, the bending beams 14, 16, 18, 20 have the supporting points 36, 38, 40, 42, respectively, which ensure an at least essentially linear course of the reinforcement sections 32, 34 in the bending beams 14, 16, 18, 20 over a predetermined section d. Indentations on the outer surfaces AF1, AF2 of the elastic body 12 are present at the supporting points 36, 38, 40, 42.

The outer surfaces AF1, AF2 connect the lateral surfaces (not shown) of the elastic body 12 extending essentially parallel to one another. The outer surfaces AF1, AF2 extend between the outer surfaces 68 and 70 of the elastic body 12 extending transversely with respect to the straight line G. The outer surfaces 68 and 70 may extend essentially parallel to one another.

According to this embodiment, the predetermined section d is significantly longer compared to the embodiment according to FIG. 1. The reinforcement 30 extends at least essentially linearly to the vicinity of one of the receiving openings 26, 28 due to the supporting points 36, 38, 40, 42. The predetermined section d spans practically the entirety of the bending beams 14, 16, 18, 20. The supporting points 36, 38, 40, 42 are indicated by indentations on the outer surfaces AF1 and AF2 of the elastic body 12. The indentations may extend to the reinforcement 30, so that the reinforcement 30 may be completely or partially exposed at the supporting points 36, 38, 40, 42.

The connecting points 56 and 58 are situated on the straight line G, above and below the receiving openings 26 and 28. Each reinforcement section 32, 34 has a deflection point 60, 62, 64, and 66 at the connecting points 56 and 58. The reinforcement sections 32 and 34 change direction at the deflection points 60, 62, 64, 66. At the deflection points 60, 62, 64 and 66, the reinforcement sections 32, 34 are curved oppositely from their curvature at the articulated sections 22 and 24. At the deflection points 60, 62, 64, 66, the reinforcement sections 32, 34 have a concave curvature or arch relative to the straight line G. At the articulated sections 22 and 24, the reinforcement sections 32, 34 are convexly curved or arched relative to the straight line G. Up to the deflection points 60, 62, 64 and 66, the reinforcement sections 32 and 34 extend in the bending beams 14, 16, 18, 20 at an angle with respect to the straight line G. Beginning at the deflection points 60, 62, 64, 66 or beginning at the connecting points 56, 58, the reinforcement sections 32, 34 extend essentially parallel to the straight line G.

The reinforcement sections 32, 34 extend to the outer surfaces 68 and 70 of the elastic body 12 essentially parallel to the straight line G. The outer surfaces 68 and 70 extend essentially transversely with respect to the straight line G and intersect it. The ends 72, 74, 76, 78 of the reinforcement sections 32, 34 may form sections of the outer surfaces 68, 70. The cross-sectional areas or also only portions of the cross-sectional areas of the ends 72, 74, 76, 78 of the reinforcement sections 32, 34 may emerge from the elastic body 12 or be discernible at the outer surfaces 68, 70. The inner sides of the reinforcement sections 32, 34 rest against one another at the connecting points 56, 58. The inner sides of the reinforcement sections 32, 34 face one another over the entire extension of the reinforcement sections 32, 34. The outer sides of the reinforcement sections 32, 34 point away from one another over the entire extension of the reinforcement sections 32, 34.

At the articulated sections 22, 24, the indentations 50, 52 are formed on the inner side of the reinforcement sections 32, 34. The reinforcement sections 32, 34 or their inner sides may be exposed in the area of the indentations 50, 52. Unlike the embodiment according to FIG. 1, no indentations are formed at the receiving openings 26, 28. The distance between the receiving openings 26, 28 and the reinforcement sections 32, 34 of the reinforcement 30 may be increased as a result of the deflection points 60, 62, 64, 66. In other words, more material of the elastic body 12 is present between the receiving openings 26, 28 and the reinforcement sections 32, 34 as a result of the deflection points 60, 62, 64, 66. Thus, higher wear resistance of the elastic bearing 10 and lower assembly forces when fastening the elastic bearing 10 to bolts or similar coupling elements may be achieved.

Figure 3:
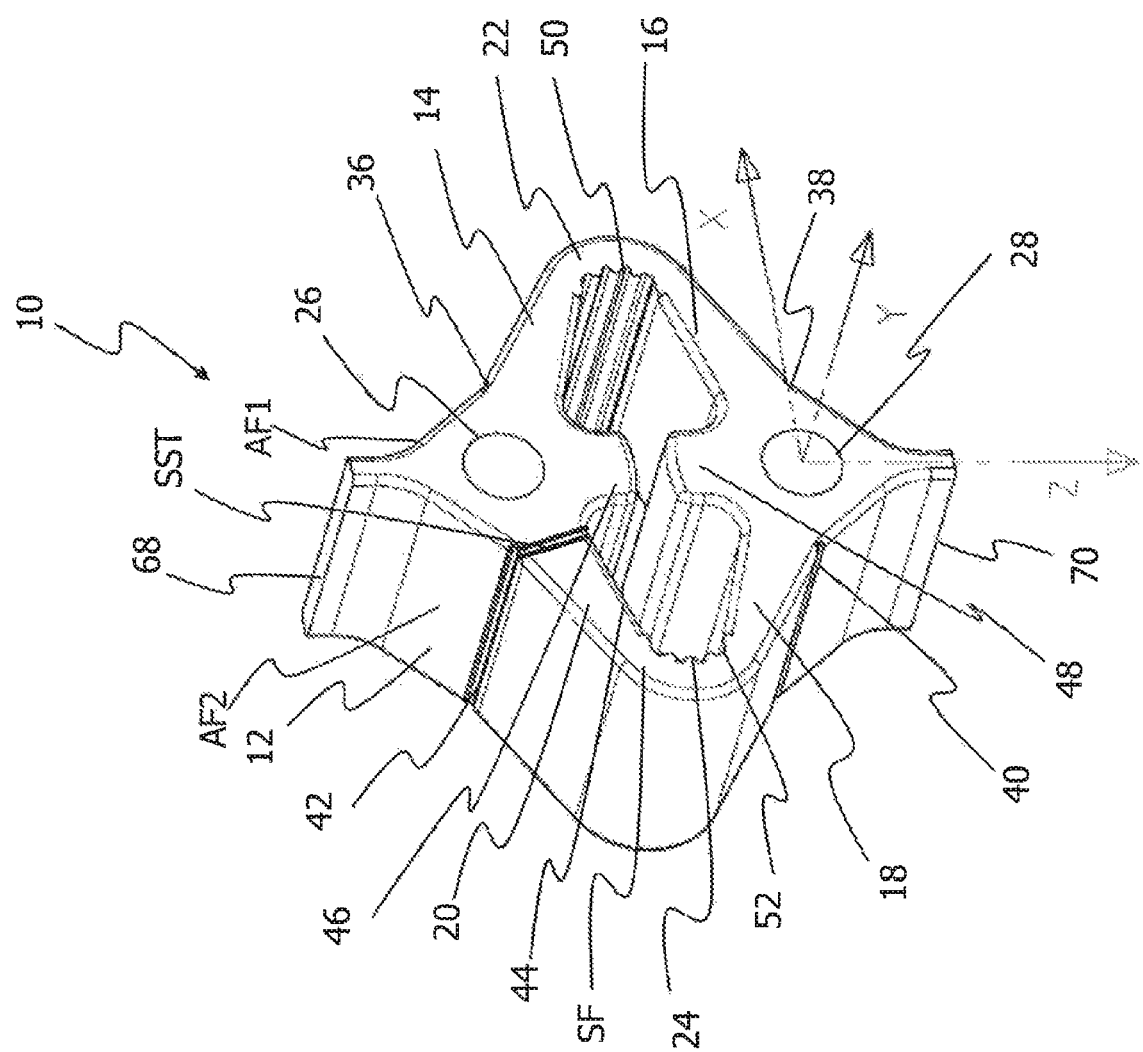
FIG. 3 shows a perspective view of an elastic bearing according to a third embodiment.

FIG. 3 shows a perspective view of an elastic bearing 10 according to a third embodiment. The elastic bearing 10 has the elastic body 12. The elastic body 12 has the opening 44. The buffer elements 46 and 48 are formed in the opening 44. At the articulated sections 22 and 24, the indentations 50 and 52 are formed in the area of the opening 44. The bending beams 14, 16, 18, 20 extend between the receiving openings 26 and 28 and the articulated sections 22 and 24. In addition, the X, Y, and Z axes are depicted in FIG. 3. The definition of these axes applies for all embodiments described herein.

The outer surfaces AF1 and AF2 of the elastic body 12 connect the outer surfaces 68, 70 to one another. The outer surfaces AF1 and AF2, only one of which is shown in FIG. 3, connect the lateral surfaces SF of the elastic body 12, which extend essentially in parallel, to one another. The supporting points 36, 38, 40, 42 are discernible on the outer surfaces AF1, AF2 of the elastic body 12 extending along the bending beams 14, 16, 18, 20. The supporting points 36, 38, 40, 42 are indicated by the indentations on the outer surfaces AF1, AF2 of the elastic body 12. The outer surfaces AF1 and AF2 have a predetermined extension in the Y direction. The supporting points 36, 38, 40, 42 or the indentations on the supporting points 36, 38, 40, 42 extend essentially in the Y direction. The supporting points 36, 38, 40, 42 may extend over the entire outer surfaces AF1, AF2 or only over portions of the outer surfaces AF1, AF2.

It is also possible for at least one supporting point SST, which holds the reinforcement 30 or the reinforcement sections 32 and 34 in position in the Y direction, to extend on the lateral surface SF of the elastic body 12.

Figure 4:
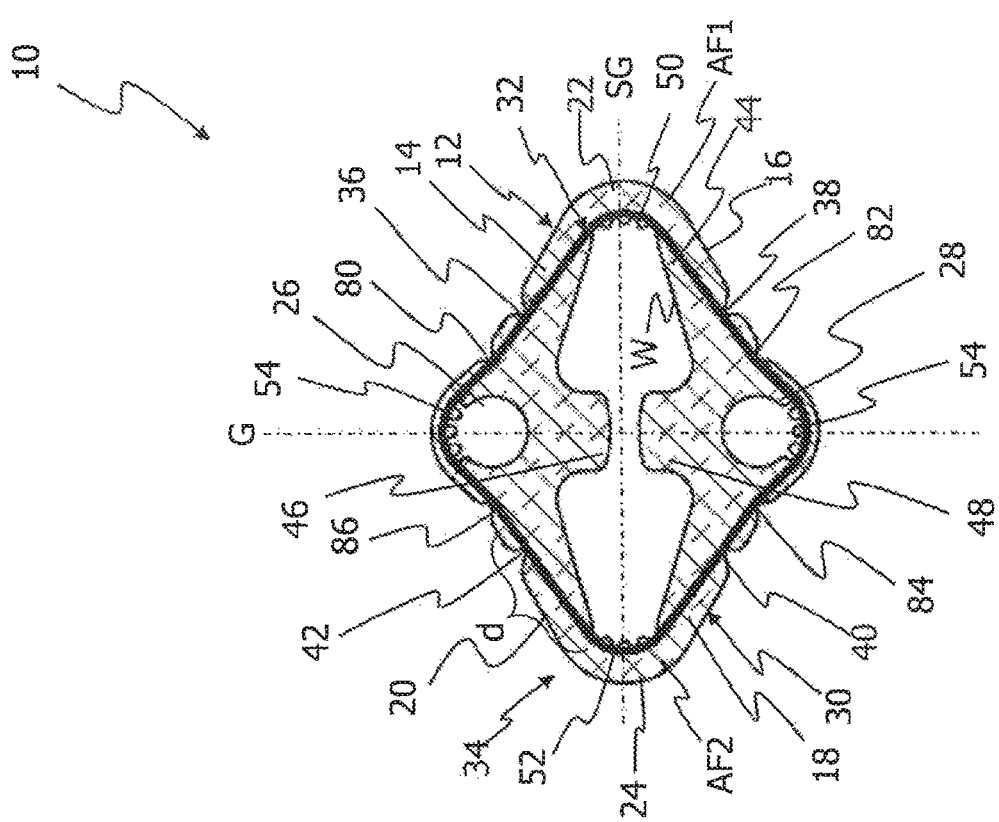

FIG. 4 shows a view of an elastic bearing 10 according to a further embodiment. The elastic bearing 10 has the elastic body 12. The elastic body 12 has four bending beams 14, 16, 18, 20. The bending beams 14 and 16 are connected to one another via the articulated sections 22 and 24. The elastic body 12 also has the two receiving openings 26 and 28. The basic design of the elastic bearing 10 according to FIG. 4 corresponds to the design of the embodiment described with reference to FIG. 1.

The reinforcement 30 extends in the elastic body 12. The reinforcement 30 has two reinforcement sections 32 and 34. The reinforcement sections 32 and 34 extend along the bending beams 14, 16, 18, 20 and the articulated sections 22 and 24. According to this embodiment, the reinforcement sections 32 and 34 are connected to one another, so that the reinforcement 30 also extends along the receiving openings 26 and 28.

In a predetermined section d, the reinforcement sections 32 and 34, starting from the articulated sections 22 and 24, extend essentially linearly in the bending beams 14, 16, 18, 20 in the direction of one of the receiving openings 26, 28. In the predetermined section d, the reinforcement sections 32, 34 extend essentially along an imaginary straight line or have a slight convex curvature relative to the straight line G. This essentially linear course may be created with supporting points 36, 38, 40, 42. Indentations in the elastic body 12 are discernible on the supporting points 36, 38, 40, 42. During manufacture of the elastic bearing 10, the reinforcement sections 32 and 34 are supported on the supporting points 36, 38, 40, and 42 in order to ensure the essentially linear course of the reinforcement sections 32, 34 at least over the predetermined section d. The essentially linear course of the reinforcement sections 32, 34 in section d is fixed by the elastic material of the elastic body 12.

In addition, two deflection points 80, 82, 84, 86 are provided in the reinforcement sections 32 and 34. The reinforcement sections 32 and 34 change direction at the deflection points 80, 82, 84, 86. As a result of the deflection points 80, 82, 84, 86, the reinforcement sections 32, 34 have an essentially concave arch in relation to a straight line G that extends through the receiving openings 26 and 28. Thus, due to the supporting points 36, 38, 40, 42, the reinforcement sections 32, 34, starting from the articulated sections 22 and 24, initially extend at least essentially linearly until they change direction at the deflection points 80, 82, 84, 86. The reinforcement sections 32, 34 merge into a concavely curved course at the deflection points 80, 82, 84, 86. The supporting points 36, 38, 40, 42 are situated closer to the articulated sections 22, 24 than are the deflection points 80, 82, 84, 86. The supporting points 36, 38, 40, 42 thus ensure an at least essentially linear course of the reinforcement sections 32, 34 in section d. Thus, the reinforcement sections 32, 34 do not change direction at the supporting points 36, 38, 40, 42, whereas the reinforcement sections 32, 34 change direction at the deflection points 80, 82, 84, 86. As a result of the supporting points 36, 38, 40, 42, the reinforcement sections 32, 34 assume a predefined course in the elastic body 12. The supporting points 36, 38, 40, 42 contribute to setting the rigidity of the elastic bearing 10.

Figure 5:
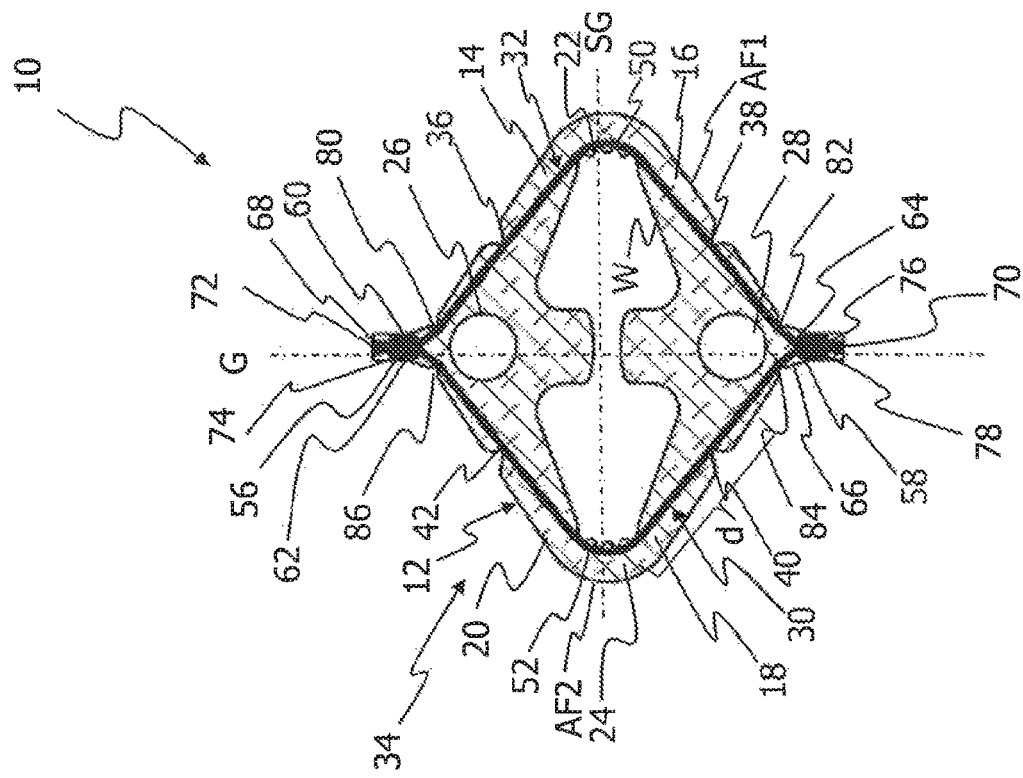
FIGS. 4 and 5 show views of further embodiments of an elastic bearing.

FIG. 5 shows a sectional view of an elastic bearing 10 according to a further embodiment. The bearing 10 has the elastic body 12 and the reinforcement 30. The reinforcement 30 includes the reinforcement sections 32 and 34. The reinforcement sections 32 and 34 extend along the bending beams 14, 16, 18, 20 and along the articulated sections 22 and 24. The reinforcement sections 32 and 34 are connected to one another at the connecting points 56 and 58.

In this embodiment as well, the bending beams 14, 16, 18, 20 have the supporting points 36, 38, 40, 42.

In the embodiment according to FIG. 5, the deflection points 80, 82, 84, and 86 are situated closer to the deflection points 60, 62, 64, 66 that are formed by the connecting points 56 and 58. As a result of the closely spaced deflection points 80, 82, 84, and 86 and 60, 62, 64, 66, the direction of the reinforcement sections 30, 32 changes twice over a short distance. The basic design of the elastic bearing 10 according to FIG. 5 corresponds to the design of the embodiment described with reference to FIG. 2.

A defined course of the reinforcement sections 32, 34 in the elastic body 12 may be created with the supporting points 36, 38, 40, 42, SST, as a result of which the rigidity of the elastic bearing 10 may be precisely set. During manufacture of the elastic bearing 10, the reinforcement sections 32 and 34 are supported on the supporting points 36, 38, 40, 42, SST in order to ensure the essentially linear course of the reinforcement sections 32, 34, at least over the predetermined section d. Supporting the reinforcement sections 32 and 34 prevents the elastic material of the elastic body 12 from being pressed outwardly during manufacture of the reinforcement sections 32 and 34. Thus, supporting the reinforcement sections 32 and 34 on the supporting points 36, 38, 40, 42 during manufacture of the bearing 10 may prevent the reinforcement sections 32 and 34 from assuming an undefined arch-shaped course. With the at least essentially linear course of the reinforcement sections 32, 34 in section d or in the bending beams 14, 16, 18, 20, it may be ensured that the elastic bearing 10 has setpoint rigidity. Fluctuations in the rigidity of the elastic bearing 10 may thus be prevented.

During manufacture of the elastic bearing 10, the reinforcement sections 32, 34 may be supported by a support tool, multiple support tools, or support elements. The stated tools or elements may be inserted into a cavity in an injection mold in order to support the reinforcement 30. The support may take place in particular during the injection of the elastic material for the elastic body 12. The support tools or the support elements ensure that the reinforcement sections 32, 34 have their predetermined course, which is then fixed by the elastic material of the elastic body 12. The indentations or similar features on the supporting points 36, 38, 40, 42 in the elastic body 12 may correspond to the engagement points of the support tools or support elements. The support tools or support elements may engage at these engagement points in order to support the reinforcement 30.

The invention claimed is:

1. An elastic bearing for the suspension of a load, comprising:
   at least one elastic body that has at least two bending beams and at least two receiving openings for receiving coupling elements, wherein at least one of the at least two bending beams is connected to at least one articulated section, and
   at least one reinforcement that is embedded in the at least one elastic body, wherein the at least one reinforcement extends linearly in the at least two bending beams in at least one predetermined section of the respective bending beam, wherein each of the at least two bending beams comprises at least one supporting point that is configured to ensure the linear course of the at least one reinforcement in the predetermined section, wherein the at least one supporting point comprises an indentation comprising a discontinuous area in the surface of the at least one elastic body and extending from an outer periphery of the at least one elastic body towards the at least one reinforcement, and wherein the indentation is positioned at a section of the respective bending beam where the at least one reinforcement extends linearly.

2. The elastic bearing according to claim 1, wherein in the predetermined section of at least one of the at least two bending beams, the at least one reinforcement is colinear with a straight line that is tangent to one of the articulated sections.

3. The elastic bearing according to claim 1, wherein the at least one reinforcement is at least partially exposed at the supporting points.

4. The elastic bearing according to claim 1, wherein the at least one supporting point is provided in the area of at least one selected from the group consisting of an outer surface of the corresponding bending beam and at least one lateral surface of the corresponding bending beam.

5. The elastic bearing according to claim 1, wherein the predetermined section extends starting from one of the articulated sections.

6. The elastic bearing according to claim 1, wherein the distance of the at least one reinforcement to a wall of a central opening in the elastic body, starting from one of the receiving openings, decreases in the direction of one of the articulated sections.

7. The elastic bearing according to claim 1, wherein the distance of the at least one reinforcement to at least one outer surface of the elastic body, starting from the receiving openings, increases in the direction of one of the articulated sections.

8. The elastic bearing according to claim 1, wherein the at least one reinforcement does not change direction at the supporting points.

9. The elastic bearing according to claim 1, wherein the at least one reinforcement has at least two reinforcement sections.

10. The elastic bearing according to claim 9, wherein each of the at least two reinforcement sections has at least one deflection point.

11. The elastic bearing according to claim 10, wherein the at least one deflection point is offset with respect to the at least one supporting point.

12. The elastic bearing according to claim 1, wherein the elastic bearing has a symmetrical design with respect to a straight line that extends through the at least two articulated sections.

13. The elastic bearing according to claim 1, wherein the elastic bearing has a symmetrical design with respect to a straight line that extends through the receiving openings.

14. The elastic bearing according to claim 1, wherein the at least one reinforcement is a thread reinforcement, a textile reinforcement, or a wire reinforcement.

15. The elastic bearing according to claim 2, wherein the at least one reinforcement is at least partially exposed at the supporting points.

16. The elastic bearing according to claim 2, wherein the elastic body has an indentation or a similar feature on at least one of the supporting points.

17. The elastic bearing according to claim 3, wherein the elastic body has an indentation or a similar feature on at least one of the supporting points.

18. The elastic bearing according to claim 2, wherein the at least one supporting point is provided in the area of at least one selected from the group consisting of an outer surface of the corresponding bending beam and at least one lateral surface of the corresponding bending beam.

19. The elastic bearing according to claim 1, wherein the discontinuous area comprises a notch.

* * * * *